United States Patent
Schuurmans

(10) Patent No.: US 7,399,137 B2
(45) Date of Patent: *Jul. 15, 2008

(54) REAR MIRROR MOUNTING ASSEMBLY

(75) Inventor: Maarten J. Schuurmans, Kingswood (AU)

(73) Assignee: Schefenacker Vision Systems Australia Pty Ltd, Lonsdale (AU)

(*) Notice: Subject to any disclaimer, the term of this patent is extended or adjusted under 35 U.S.C. 154(b) by 0 days.

This patent is subject to a terminal disclaimer.

(21) Appl. No.: 11/375,232

(22) Filed: Mar. 14, 2006

(65) Prior Publication Data

US 2006/0165477 A1 Jul. 27, 2006

Related U.S. Application Data

(63) Continuation of application No. 10/472,536, filed as application No. PCT/AU02/00304 on Mar. 19, 2002, now Pat. No. 7,044,676.

(30) Foreign Application Priority Data

Mar. 19, 2001 (AU) .................... PR3812

(51) Int. Cl.
*F16C 11/12* (2006.01)

(52) U.S. Cl. ............... 403/95; 403/92; 403/96; 248/549; 248/478; 296/1.11; 359/841; 359/872

(58) Field of Classification Search ............... 403/92, 403/95, 96, 100; 248/548, 549, 478, 483; 296/1.11; 359/841, 872
See application file for complete search history.

(56) References Cited

U.S. PATENT DOCUMENTS

| 1,501,713 | A | 7/1924 | McCaffrey |
| 2,584,451 | A | 2/1952 | Hopp |
| 3,322,388 | A | 5/1967 | Budreck |
| 4,135,694 | A | 1/1979 | Stegenga et al. |
| 6,024,459 | A | 2/2000 | Lewis |

FOREIGN PATENT DOCUMENTS

| DE | 78 35 006 U1 | 4/1979 |
| DE | 34 29 713 A1 | 2/1986 |
| DE | 41 19 748 A1 | 12/1992 |
| FR | 2 233 825 A | 1/1975 |
| GB | 2 186 246 | * 8/1987 |

* cited by examiner

*Primary Examiner*—Daniel P. Stodola
*Assistant Examiner*—Michael P Ferguson

(57) ABSTRACT

A pivot arrangement between a mirror head and a mirror mounting bracket of a rear vision mirror for a motor vehicle which uses a disc spring with a negative spring rate over part of its travel. The disc spring has a height to thickness ratio of greater than $\sqrt{2}(1.414)$.

8 Claims, 5 Drawing Sheets

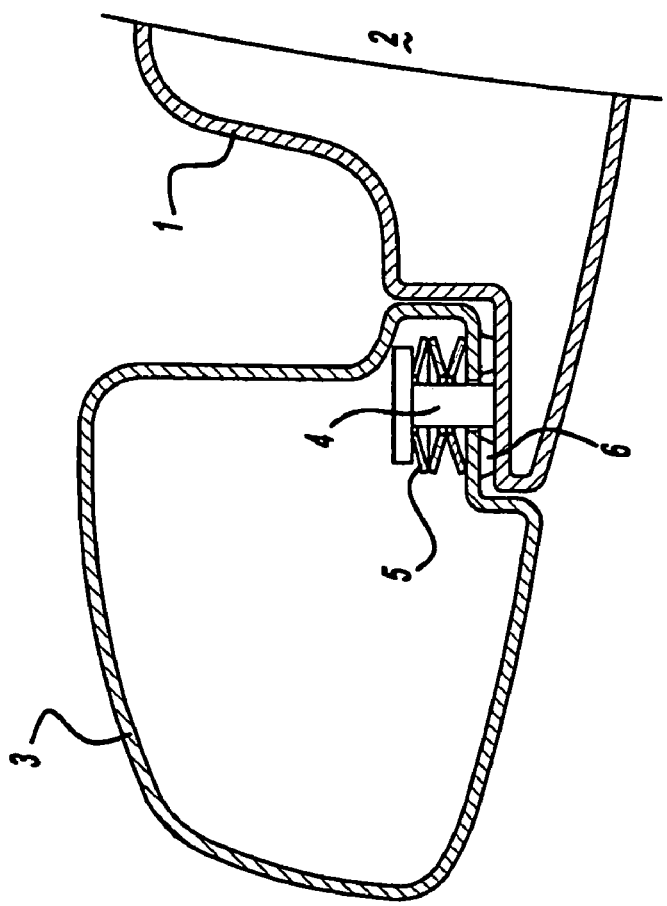
FIG-1A *(Prior Art)*
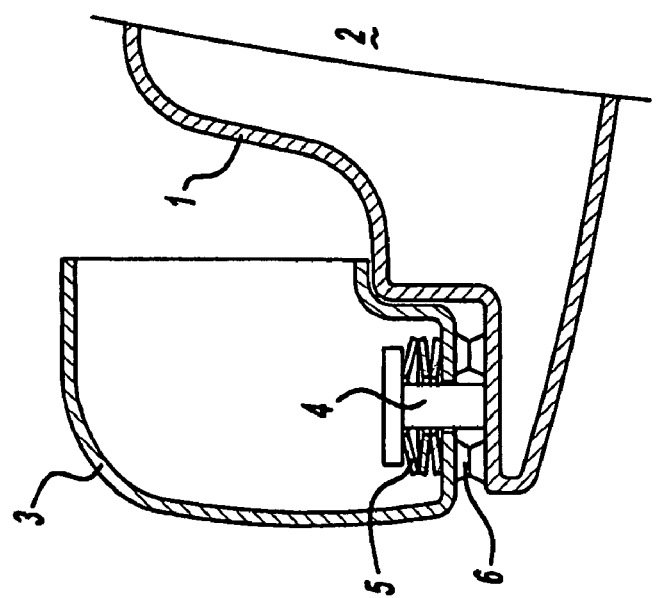
FIG-1B *(Prior Art)*

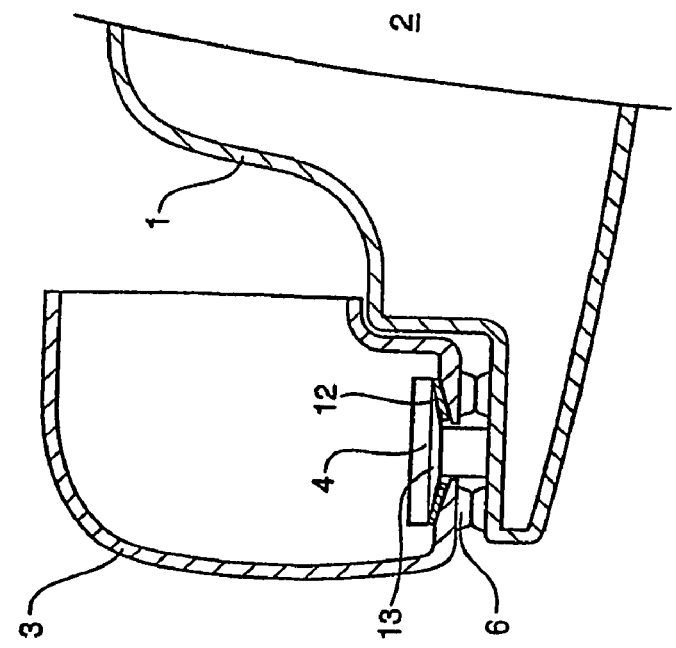
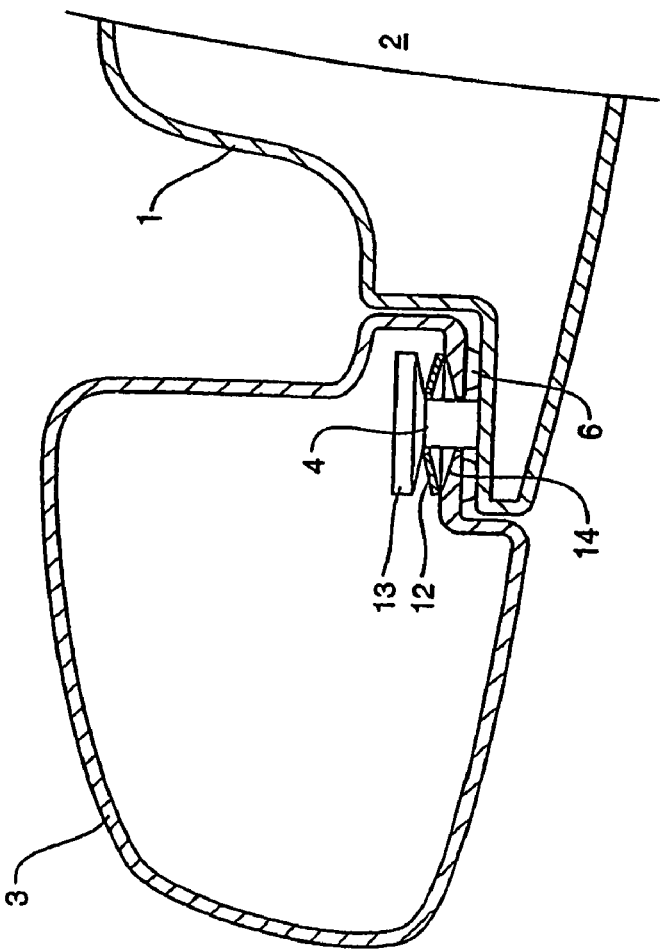
*Fig 3A*     *Fig 3B*

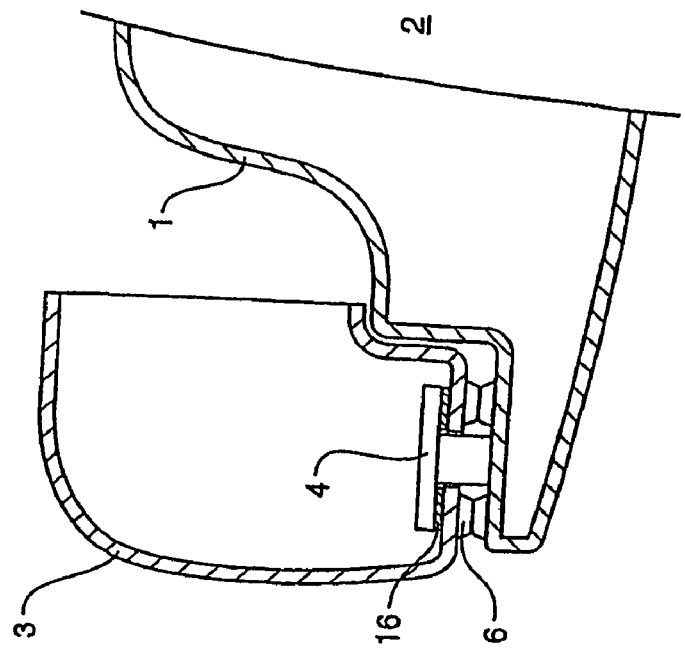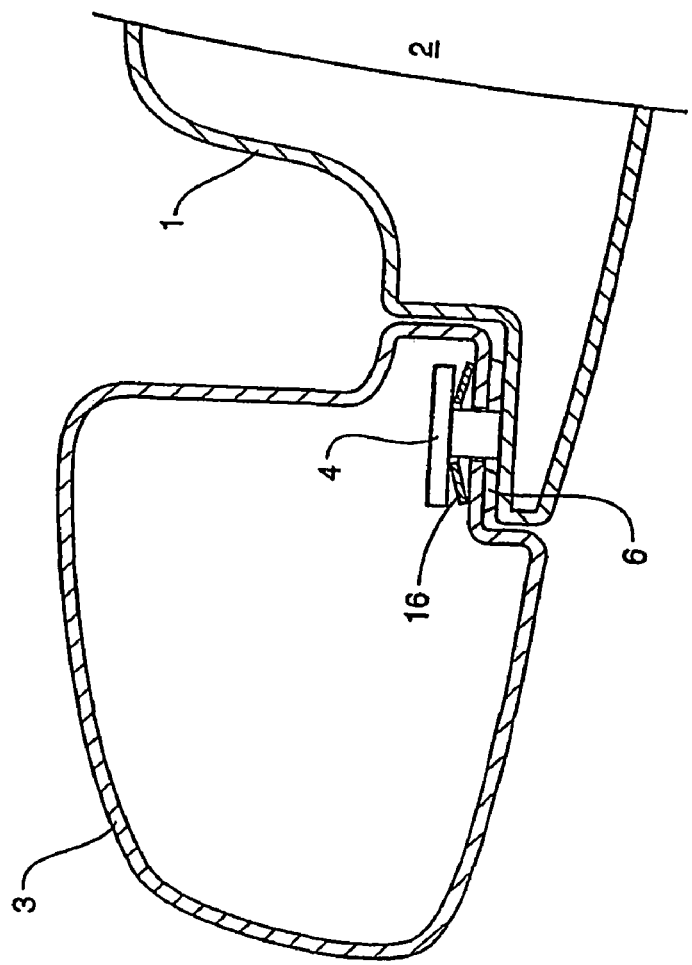

REAR MIRROR MOUNTING ASSEMBLY

This application is a continuation of U.S. patent application Ser. No. 10/472,536 filed on Sep. 18, 2003, now U.S. Pat. No. 7,044,676 which is the National Stage of International Application No. PCT/AU02/00304, filed Mar. 19, 2002, which claims priority to Australian Application No. PR 3812, filed Mar. 19, 2001. The disclosures of the above applications are incorporated herein by reference.

FIELD OF THE INVENTION

This invention relates to pivot assemblies and more particularly to pivot assemblies for use on exterior mirrors of motor vehicles.

BACKGROUND OF INVENTION

Conventional foldaway or breakaway mirrors used on the exterior of motor vehicles which rotate about a central spigot require a spring element to keep the mirror stable in a drive position. It is necessary to prevent vibration of the mirror caused by motion of the motor vehicle and wind passing over the mirror.

The same spring element that provides the stability can also, via a detent system, provide a torque to resist accidental displacement of the mirror head under small forces but under large forces the detent arrangement and the spring element force can be overcome to allow the mirror case to rotate about the spigot. This is done primarily to protect the mirror from damage, to protect the third party object that collides with the mirror from damage or to reduce the overall width of the vehicle.

The use of a spring element loaded to prevent vibration and to provide a torque to resist accidental displacement is necessary for both manual fold mirrors and many power fold mirrors. It is independent of the construction of a spigot, whether that be integrated, bayonet or the like, and it is also independent of the detent system used. It is also independent of the type of construction or assembly system used.

A spring used with a preload and detent system for a motor vehicle external mirror goes through a number of different stages during assembly and operation. First the spring has a free length or maximum extension. Next the spring is preloaded during assembly until it is in the drive or installed position. In some systems such as a bayonet assembly the preload position is not the same as the installed or drive position as there may be an intermediate step in the assembly process that overcompresses the spring. During foldaway or breakaway the spring is further compressed to a new position. The displacement of the spring during this foldaway or breakaway compression is referred to as the working stroke. After foldaway or breakaway the mirror can then be reset to the drive position and the spring will return to the installed position.

It should be noted that the process as discussed above is true for manual and power fold systems although some power fold systems do not compress the spring during the power fold cycle but all compress the spring during a manual cycle.

The main aim or target of the spring and detent design is to achieve a minimum spring preload stroke for ease of assembly, to achieve a minimum spring damp force for mirror stability and to achieve a target spring force coupled with the detent system that gives a target breakaway torque for the mirror.

It is generally desirable, however, that once the compression of the spring has occurred to overcome the detent then the spring force applied to the pivot assembly and hence the amount of torque necessary to be applied to rotate the mirror head about the pivot assembly is a minimum at all stages so that there is minimum stress in the system during foldaway and breakaway.

Other aims are to achieve the free rotation torque requirements of the mirror and any park detent torque requirements and upon reset achieve a smooth positive re-engagement in the drive position. It is also desirable to minimise the total package size for styling freedom and reducing mirror extension away from the vehicle by allowing the glass to sweep over the top of the pivot.

In the past spring elements in mirror systems have used coil springs but these generally require a large preload stroke but during breakaway torque increases during rotation until escape is achieved but upon reset they achieve positive re-engagement in the drive position but the action is often violent. Coil springs do not minimise a total package size.

It has also been proposed to use positive spring rate disc springs and while these can minimise preload strokes during foldaway or breakaway tension increases which puts extra loads on the system and during re-engagement into the drive position the action can often be violent.

It is an object of this invention to provide a pivot system and in particular spring loading for a detent system which overcomes one or more of the problems discussed above.

BRIEF DESCRIPTION OF THE INVENTION

In one form therefore the invention is said to reside in a pivot arrangement between a mirror head and a mirror mounting bracket of a rear vision mirror, the arrangement including a detent arrangement between the mirror mounting bracket and the mirror head that enables rotation of the mirror head with respect to the mirror mounting bracket from a locked position where the mirror head is held in a selected position with respect to the mirror mounting bracket to a disengaged position in which the mirror head is rotated with respect to the mirror mounting bracket and a spring assembly adapted to apply force against the detent arrangement, the spring assembly including at least one disc spring having a negative spring rate when compressed from a preloaded position.

A negative spring rate disc spring is a disc spring whose force deflection profile has an area in which the force decreases as the spring deflection increases. Negative spring rate disc springs also have sections in them that have a positive spring rate part of the curve. The positive section of the curve is preferably utilised for preloading the spring and the negative section is preferably utilised for the working stroke of the system.

Negative spring rate disc springs fall into two categories.

A first category is those springs with large height to thickness ratios whose force is negative over part of the force deflection curve and so when inverted or turned outside will remain that way.

The second category are those springs with a medium height to thickness ratio whose force is always positive over the force deflection curve and when inverted or turned inside out will revert back to their original position.

In a preferred form of the invention, therefore, the negative spring rate disc spring according to the present invention has a height to thickness ratio (H/t) greater than 1.414 (H/t>$\sqrt{2}$).

It will be seen that the spring assembly of the present invention preferably has a positive spring rate for the first part of its deflection and a negative spring rate following the first part of its deflection.

The spring assembly is preferably assembled and preloaded against the detent assembly so that a maximum spring force is applied in the locked position and that spring force decreases during movement to the disengaged position.

In a preferred embodiment of the invention the disc spring has a height to thickness ratio (H/t) greater than 1.414 and less than 2.828 ($\sqrt{2}$<H/t<$\sqrt{8}$).

Both springs of the two categories discussed above have a positive spring rate up to a local maximum force peak after which the force decreases to a local minimum. Once the minimum has been reached the spring rate again turns positive with increasing force with increasing displacement. The spring is developed so that the local maximum force provides sufficient force for mirror stability in the drive position and in conjunction with the detent system the correct breakaway or foldaway torque. The spring is preloaded to the maximum force position during installation. During breakaway or foldaway the negative spring rate portion of the force deflection curve is utilised.

When the detent arrangement is returned to the drive position a smooth positive re-engagement without excessive violence is obtained.

The spring assembly may includes one, two or three disc springs having a negative spring rate when compressed from a preloaded position. When more than one disc spring is used they may be stacked alternatively concave and convex so that adjacent disc springs have their inner or outer edges abutting.

Australian Provisional Patent Application No. PR 3955 titled "Vehicle external mirror wiring integration" discloses a pivot assembly having contacts mounted on detent surfaces for transmission of power from the base to the head. These features and other features disclosed in PR 3955 could be used with the present invention and the disclosure of PR 3955 is herewith incorporated in its entirety into this specification.

Australian Provisional Patent Application No. PR 3953 titled "Modular pivot using central pivot pin" discloses a pivot mechanism using a solid pivot pin. This features and other features disclosed in PR 3953 are/could be used with the present invention and the disclosure of PR 3953 is herewith incorporated in its entirety into this specification.

Australian Provisional Patent Application No. PR 8300 titled "Eternal vehicle mirror having self-loading pivot" discloses a mirror assembly having a self-loading pivot mechanism wherein initial rotation of the mirror head with respect to the mirror base causes pre-loading of a spring. These features and other features disclosed could be used with the present invention and the disclosure of PR 8300 is herewith incorporated in its entirety into this specification.

International Application No. PCT/AU00/00413 titled "Method of producing a plastic moulded part including a film covering" discloses a method of forming a moulding component comprising an outer thin film component with an adhered moulded shell. The method of that disclosure could be used to mould hollow form components that may be used with this invention (for instance for the shell of the head and base) and the disclosure of this application is incorporated herewith in its entirety.

Australian Provisional Patent Application No. PR 6683 titled "Foldable vehicle external mirror having auxiliary mirror" discloses a vehicle external mirror having an auxiliary mirror mounted to a distal side of the mirror head. The auxiliary mirror provides rear vision when the mirror head is in its folded position. This features and other features disclosed in PR 6683 are/could be used with the present invention and the disclosure of PR 6683 is herewith incorporated in its entirety into this specification.

Australian Provisional Patent Application No. PR 6204 titled "Mirror Heater" discloses an automatic heating control system and apparatus for heating the surface of a mirror to de-ice or de-fog the mirror. The heating process is initiated upon starting the vehicle engine, and is conducted in accordance with a preset timing sequence and in accordance with an actual measured temperature of the mirror. These features and other features disclosed in this document could be used with the present invention and the disclosure of PR 6204 is hereby incorporated in its entirety into this current specification.

It would also be possible to incorporate other components with the mirror base (mounting bracket) and or mirror head. Such components include electronic sensors such as proximity sensors to determine if the vehicle mirror is close to an obstruction, sensors that sense external temperature and humidity, and sensors incorporated with the car security system such as motion detectors. Other various electronic equipment may be incorporated into the mirror base (mounting bracket) such as lights used to light the area around the vehicle, or lights that may be controlled from within the vehicle that enable the light to be moved so as to provide directional lighting. Speakers and microphones used to communicate to people external of the vehicle may also be incorporated as well as antennas for various apparatus such as mobile phones, GPS devices and other radio communication devices. In addition, transmitters may be incorporated into the mounting bracket which are used for controlling external objects such as garage doors or providing radio transmissions which may be used, for example, to track or locate the vehicle. Other electronic devices such as automatic toll payment systems or remote transaction systems may be incorporated into the mounting bracket to enable electronic registration of various toll payments.

Cameras may also be incorporated into the mirror base (mounting bracket) which are both forward and rearward looking which are designed to continuously record digital images and to store those images either on command or as a result of an accident or incident. Motion sensors including accelerometers can be used to determine the occurrence of an accident or incident so that images before and after the event are stored.

BRIEF DESCRIPTION OF THE DRAWINGS

This then generally describes the invention but to assist with understanding reference will now be made to the accompanying drawings which show preferred embodiments of the invention.

In the drawings:

FIGS. 1A and 1B show the prior art form of a mirror mounting system using a positive rate disc spring;

FIGS. 3A and 3B shows a mirror mounting system according to one embodiment of the present invention using a negative rate disc spring with a height to thickness ratio between 1.414 and 2.282;

FIGS. 4A and 4B show a construction of a mirror assembly according to another embodiment of the present invention with a negative rate disc spring with a heights to thickness ratio of grater than 2.828;

DETAILED DESCRIPTION OF PREFERRED EMBODIMENTS

Figure 2A:
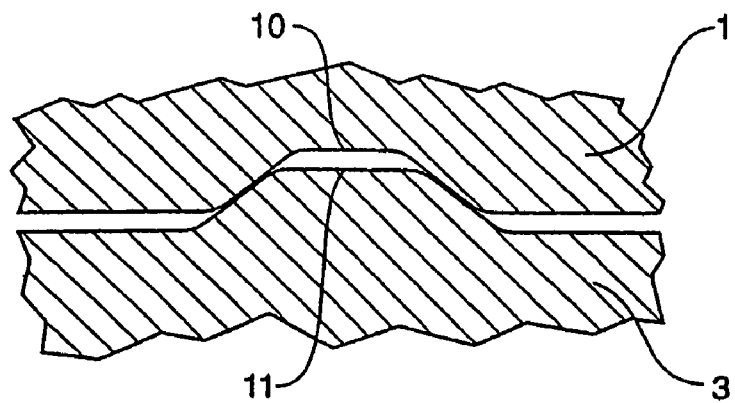
FIGS. 2A, 2B and 2C show a stretched out view of a detent system and the three positions during the foldaway/breakaway cycle.

Now looking at the drawings and in particular FIGS. 1A and 1B it will be seen that in the prior art a mirror base 1 is mounted to a vehicle body 2 and a mirror head 3 is pivoted to the base 1 by means of a pivot pin 4 which is loaded with positive rate disc springs 5. A detent system which will be discussed in more detail with reference to FIG. 2 is in the region 6 between the base 1 and the mirror head 3.

As shown in FIG. 1B, when the mirror head is rotated to a breakaway or foldaway position the detent system causes the head to move down slightly against the load of the disc springs 5 as it is rotated.

In FIG. 1A the springs are in their preloaded state and in FIG. 1B the springs have been moved through their working stroke.

As these are positive rate disc springs the load applied to the detents during the movement from the driving position to the escape position and the foldaway/breakaway position continually increases.

Figure 2B:
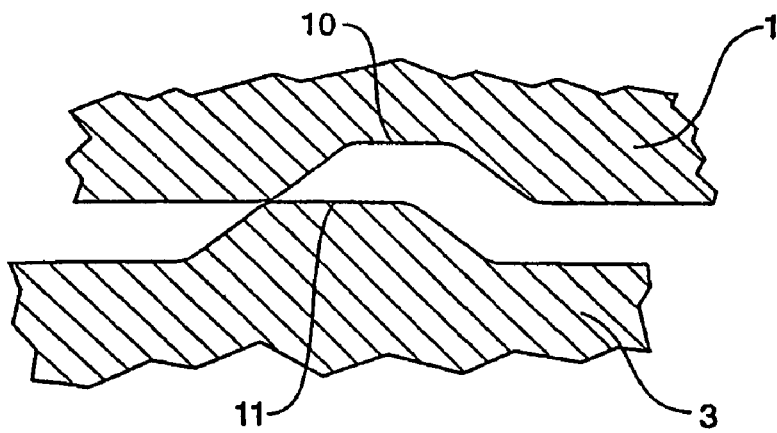
Figure 2C:
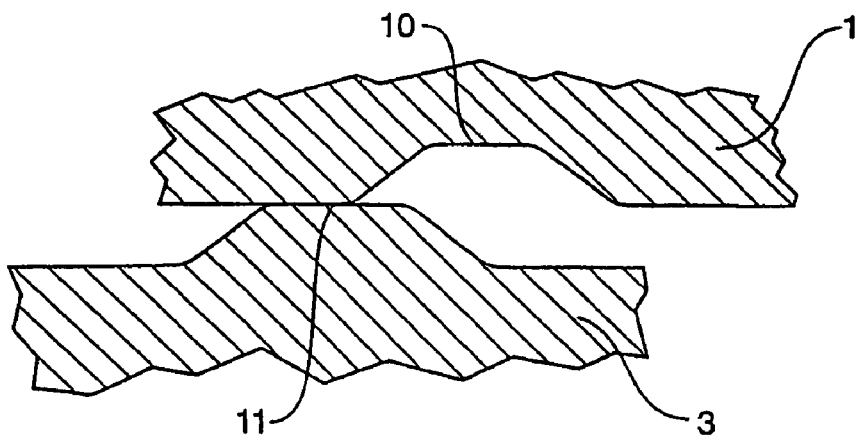

The three positions of a detent system are shown in a stylised stretched out form in FIGS. 2A, 2B and 2C.

In FIG. 2A, the driving position, the detent arrangement has been shown in a stylised form with a recess 10 on the mirror base and a projection 11 on the mirror head with the projection 11 received into the recess 10. It will be realised of course that the detents are in fact in a circumferential position around the pivot pin 4 and hence movement from the driving position to the escape position and foldaway/breakaway position is achieved by rotation of the mirror head with respect to the base in either direction.

As shown in FIG. 2B the mirror head has been rotated slightly with respect to the base so that the projection 11 has partially moved out of the recess 10. This is the escape position and it will be noted that besides the rotational movement there has been a lateral movement of the mirror head away from the mirror base and this movement is taken up by the working stroke of the spring assembly.

In FIG. 2C continued rotation of the mirror head with respect to the mirror base has moved the projection 11 away from the recess 10 and further loading of the spring assembly has not occurred. There must be sufficient force, however, still applied by a spring assembly in this position to hold the mirror in the foldaway or breakaway position to the degree required to achieve stability of the mirror head in the parked position.

In FIGS. 3A and 3B a mirror pivoting system is shown in which a negative rate disc spring having a height to thickness ratio between 1.414 and 2.828 is depicted. In this embodiment components with the same function have the same reference numerals as those shown in FIGS. 1A and 1B.

In this embodiment there is a single negative rate disc spring 12. Under the head 13 of the pivot pin 14 is a convex bevel and there is a concave bevel 14 around the aperture for the pivot pin 4 in the base 1. These convex and concave recesses provide a long working stroke for the spring 12 between the driving position shown in FIG. 3A and the foldaway/breakaway position shown in FIG. 3B. It will be noted that in the foldaway/breakaway position the spring 12 is in fact inverted but upon return of the mirror head to the driving position the inverted springs will automatically re-invert to the driving position shown in FIG. 3A.

FIGS. 4A and 4B show a mirror pivot system which uses a negative rate disc spring having a height to thickness ratio greater than 2.828.

It will be noted that in this embodiment the disc spring 16 has a working stroke from the normal conical position shown in FIG. 4A to a substantially flat position shown in FIG. 4B. If the spring is moved beyond the substantially flat position it will not necessarily re-invert back to the driving position upon return of the mirror head to the driving position unless some other arrangement is provided to return the spring to its driving position.

Figure 5A:
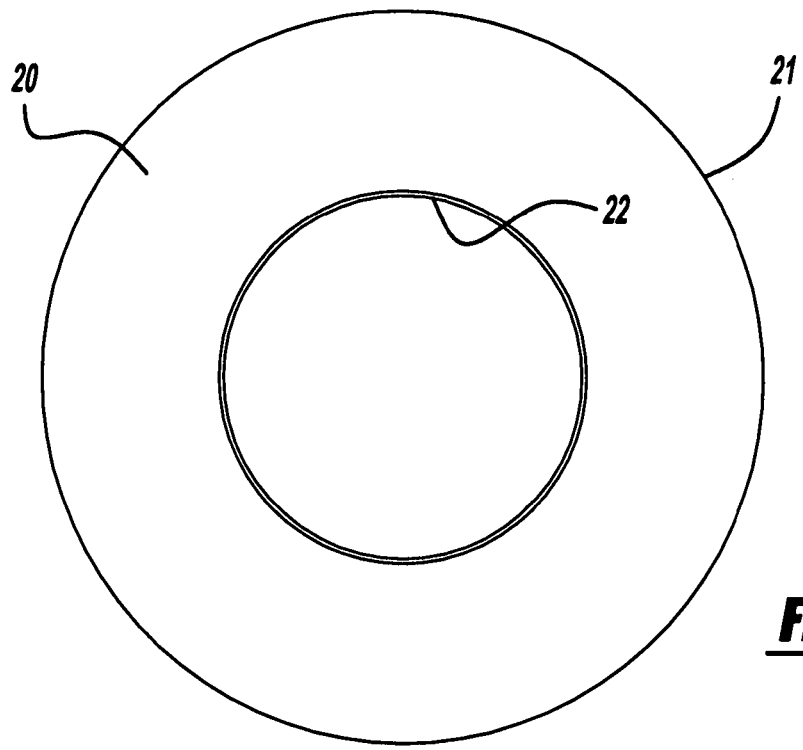
FIG. 5 shows several views of a disc spring showing the measurement of the height and thickness.
Figure 5B:
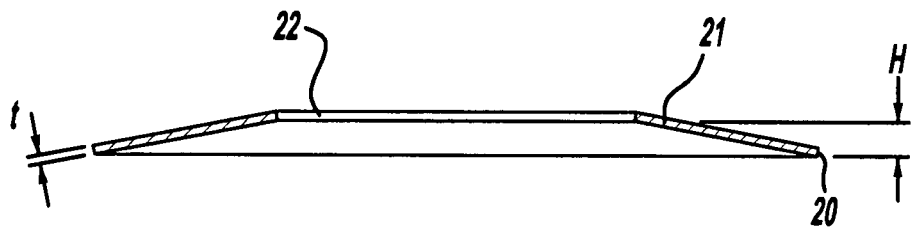
Figure 5C:
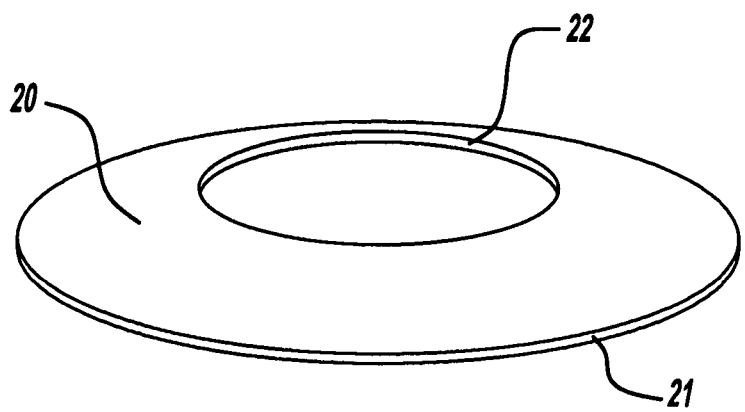

In FIG. 5 there is a plan view, a transverse cross-sectional view and a perspective view of a disc spring according to the present invention. The disc spring 20 has a substantially conical shape with an aperture 22 in the centre and a peripheral edge 21 below the aperture 22. The thickness is the actual thickness of the metal from which the spring is formed taken on the angle of the conical shape and the height is the difference between the lower edge of the central aperture and the lower edge of the peripheral rim.

A spring for instance may be formed to have the following dimensions:

| | |
|---|---|
| Outside diameter | 40 mm |
| Aperture diameter | 20 mm |
| Thickness | 0.6 mm |
| Height | 1.4 mm |

Hence the value H/t=1.4/0.6=2.33

Throughout this specification various indications have been given as to the scope of this invention but the invention is not limited to any one of these but may reside in two or more of these combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The claims defining the invention are as follows:

1. A pivot arrangement between a mirror head and a mirror mounting bracket of a rear vision mirror, the arrangement including:

a detent arrangement having a plurality of projections and mating recesses between the mirror mounting bracket and the mirror head that enables rotation of the mirror head with respect to the mirror mounting bracket from a locked position wherein said projections engage said recesses, where the mirror head is held in a selected position with respect to the mirror mounting bracket, to a disengaged position wherein said projections and said recesses are disengaged, in which the mirror head is rotated with respect to the mirror mounting bracket;

a spring assembly adapted to apply force against the detent arrangement, the spring assembly including at least one disc spring moveable with said mirror head between said locked position and said disengaged position, wherein said at least one disc spring has a preloaded position when said spring assembly is in said locked position and said at least one disc spring becomes compressed upon the movement of said spring assembly from said locked position to said disengaged position, wherein said at least one disc spring has a negative spring rate when compressed from said preloaded position; and a concave bevel in said mirror head, said concave bevel is positioned adjacent said at least one disc spring, wherein at least one disc spring will be received in said concave bevel when compressed.

2. A pivot arrangement as in claim 1 wherein the negative spring rate disc spring has a positive spring rate for the first part of its deflection and a negative spring rate following the first part of its deflection.

3. A pivot arrangement as in claim 1 wherein the negative spring rate disc spring has a height to thickness ratio greater than 1.414.

4. A pivot arrangement as in claim 1 wherein the negative spring rate disc spring has a height to thickness ratio greater than 1.414 and less than 2.828.

5. The pivot arrangement of claim 1 wherein said detent arrangement causes said mirror head to move upward with respect to said mounting bracket when said mirror head moves from said locked position to said disengaged position.

6. The pivot arrangement of claim 1 wherein said negative spring rate will have slight positive force when said mirror head is in said disengaged position in order to stabilize said mirror head.

7. The pivot arrangement of claim 1 further comprising a pivot pin extending from a surface of said mirror mounting bracket, wherein said mirror head is rotatably connected to said pivot pin so said mirror head moves between said locked position and said disengaged position by rotating about said pivot pin and said at least one disc spring circumscribes said pivot pin.

8. The pivot arrangement of claim 7 further comprising a convex bevel on a head of said pivot pin on a side of said at least one disc spring opposite said concave bevel, wherein said convex bevel facilitates the compression of said at least one disc spring into said concave bevel.

* * * * *